United States Patent
Hanson et al.

(10) Patent No.: US 6,710,754 B2
(45) Date of Patent: Mar. 23, 2004

(54) MOVEABLE OUTPUT DEVICE

(75) Inventors: William Robert Hanson, Mountain View, CA (US); Shawn R. Gettemy, San Jose, CA (US); Sherridythe A. Fraser, San Jose, CA (US); Yoon Kean Wong, Redwood City, CA (US); Mark W. Oliver, Fox River Grove, IL (US)

(73) Assignee: Palm, Inc., Santa Clara, CA (US)

( * ) Notice: Subject to any disclaimer, the term of this patent is extended or adjusted under 35 U.S.C. 154(b) by 157 days.

(21) Appl. No.: 09/997,382

(22) Filed: Nov. 29, 2001

(65) Prior Publication Data

US 2003/0098845 A1 May 29, 2003

(51) Int. Cl.$^7$ ................................................ G09G 5/00
(52) U.S. Cl. ........................................ 345/2.1; 345/1.2
(58) Field of Search .......................... 345/1.1, 1.2, 1.3, 345/2.1, 2.2, 2.3, 3.1, 3.4, 158, 156, 169, 173, 901, 903; 178/18.1

(56) References Cited

U.S. PATENT DOCUMENTS

| | | |
|---|---|---|
| 4,306,768 A | 12/1981 | Egging |
| 4,769,680 A | 9/1988 | Resor, III et al. |
| RE33,836 E | 3/1992 | Resor, III et al. |
| 5,146,049 A * | 9/1992 | Shima .......................... 345/173 |
| 5,210,969 A | 5/1993 | Suarez |
| 5,274,363 A * | 12/1993 | Koved et al. .................. 345/2.1 |
| 5,324,202 A | 6/1994 | Meyers et al. |
| 5,528,259 A | 6/1996 | Bates et al. |
| 5,714,972 A * | 2/1998 | Tanaka et al. ............... 345/156 |
| 5,818,425 A * | 10/1998 | Want et al. ................... 345/158 |
| 5,923,522 A * | 7/1999 | Sajna .......................... 361/288 |
| 6,046,722 A | 4/2000 | McKiel, Jr. |
| 6,111,527 A | 8/2000 | Susel |
| 6,184,943 B1 | 2/2001 | Sellers |
| 6,243,074 B1 * | 6/2001 | Fishkin et al. ............... 345/156 |
| 6,327,533 B1 | 12/2001 | Chou |
| 6,341,438 B1 | 1/2002 | Sianos |
| 2002/0079143 A1 * | 6/2002 | Silverstein et al. ....... 178/18.01 |
| 2002/0158921 A1 * | 10/2002 | Silverstein .................. 345/864 |
| 2003/0098832 A1 * | 5/2003 | Fraser et al. ................... 345/87 |

OTHER PUBLICATIONS

Miceli, Gene A., *Display Technologies*, pp. 1–11, printed from the Internet web site: http://seminars.seyboldreports.com/seminars/20001_boston/47/GeneMiceli.ppt (including a chart with a date of Feb. 7, 2001).

E Ink, *What is Electronic Ink?*, pp. 1–2, printed from the Internet web site: http://www.eink.com/technology/index.htm on Oct. 10, 2001.

*Electronic Reusable Paper*, pp. 1–2, printed from the Internet web site: http://www.parc.xerox.com/dhl/projects/gyricon/ on Oct. 10, 2001.

(List continued on next page.)

Primary Examiner—Xiao Wu
(74) Attorney, Agent, or Firm—Foley & Lardner

(57) ABSTRACT

A display system is disclosed. The display system includes a processor. The display system also includes a first display device having a first display surface and receiving display data from the processor. The display system also includes a second displayed device having a display area smaller then the first display device and moveable over the surface of the first display device. The display system also includes a sensor in communication with the processor and communicating location data to the processor. The location data is representative of the relative location of the first display to the second display. Further still, the display system includes a program running on the processor and providing display data to the first and second display devices. The display data is provided to the second display device based on the location data.

12 Claims, 2 Drawing Sheets

OTHER PUBLICATIONS

Actualdepth Technology, *Technology*, pp 1–2, printed from the Internet web site: http://www.actualdepth.com/default.cfm?flashAvailable=true on Oct. 19, 2001.

Actualdepth Technology, *Products*, pp. 1–3, printed from the Internet web site: http://www.actualdepth.com/default.cfm?pageID=7 on Oct. 19, 2001.

Actualdepth Technology, *Case Studies*, pp. 1–2, printed from the Internet web site: http://www.actualdepth.com/default.cfm?pageID=179 on Oct. 19, 2001.

Deep Video Imaging—*Next Generation Display Technology*, pp. 1–2, printed from the Internet web site: http://www.actualdepth.com/default.cfm?pageID=49&81F23802–C1 . . . on Oct. 19, 2001.

* cited by examiner

MOVEABLE OUTPUT DEVICE

BACKGROUND

The present invention relates generally to the field of output devices. In particular, the invention relates to output devices and/or input and output devices that may be moved over a large display and provide output related to images on the large display. Further, the invention relates to apparatuses and methods for providing enhanced images and/or other types of input and/or output using moveable devices on a planar display screen.

Liquid crystal display monitors have conventionally been used to produce images for computers and handheld computers. As the need for displays to provide a large amount of information to users has grown, large form factor displays have become more desirable in certain situations. However, as large form factor flexible, semi-flexible, or rigid displays become more commonplace, providing the resources to refresh or support such a display may burden both the processor and the power source, especially for small portable devices in which such resources are limited.

Accordingly, there is a need for portable and/or other computing devices that use large form factor flexible, rigid or semi-flexible displays to be used in conjunction with a moveable auxiliary input and output device that may be moveable over the surface of the display. There is also a need for a large planar display device that is capable of displaying a two-dimensional image on a first plane or surface and allowing images and/or input/output based on the location of a smaller moveable input and/or output device that is moveable over the surface of the display.

It would therefore be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An exemplary embodiment of the invention relates to a display system. The display system includes a processor. The display system also includes a first display device having a first display surface and receiving display data from the processor. The display system also includes a second display device having a display area smaller then the first display device and moveable over the surface of the first display device. Further, the display system includes a sensor in communication with the processor and communicating location data to the processor. The location data is representative of the relative location of the first display to the second display. Further still, the display system includes a program running on the processor and providing display data to the first and second display devices, such that the display data provided to the second display device is based on the location data.

Another exemplary embodiment of the invention relates to a method of providing information to a display system user. The method includes providing a first image on a first display. The method also includes detecting the location of a second display relative to the first display. Further, the method includes providing data to the second display based on the detected location of the second display. Further still, the method includes generating a second image on the second display, with the second image generated from the data provided to the second display to provide at least one of enhanced display of a portion of the first image, solicitation for input, and additional output not provided in the first image.

A further exemplary embodiment of the invention relates to a moveable output device configured for movement across a primary display surface. The primary display is in communication with a processing device. The moveable output device includes a device housing supporting at least one of a visual display, an audio device and a tactile feedback device, the device housing supporting a processor. The moveable output device also includes a wireless communications device receiving output data from the processing device. The output data is based on location data from a location sensor sensing the relative location of the device housing and the primary display surface. The output device generates an output based on the output data. A user of the output device receives an enhanced output as compared with the primary display output.

Alternative exemplary embodiments relate to other features and combination of features as may be generally recited in the claims.

BRIEF DESCRIPTION OF THE DRAWINGS

The invention will become fully understood from the following detailed description, taken in conjunction with the accompanying drawings, wherein like reference numerals refer to like elements, in which.

DETAILED DESCRIPTION OF EXEMPLARY EMBODIMENTS

A moveable output device is described below. The moveable output device is capable of providing a user with output data relating to information displayed on a primary display.

Figure 1:
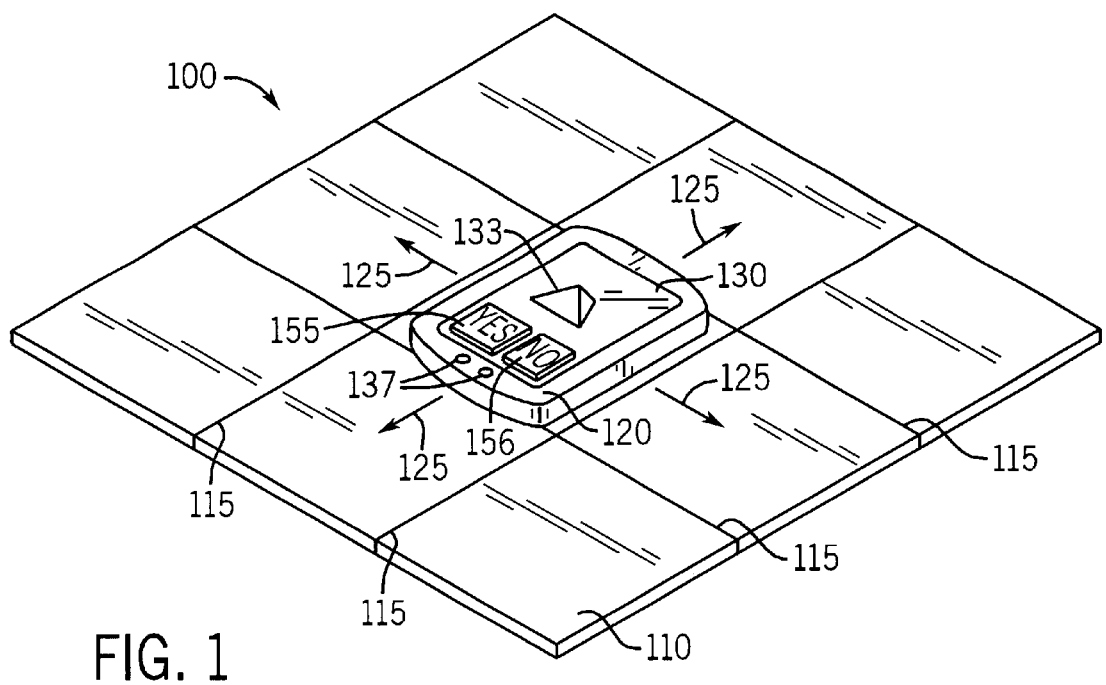
FIG. 1 is a generalized diagram of a moveable output device providing output to a user based on the location of the output device relative to the larger display screen.

Referring now to FIG. 1, a display system 100 is depicted. Display system 100 includes a flat-screen display 110 having a relatively large display area. Display 110 may be any of a variety of electronic display devices, including, but not limited to, cathode ray tube (CRT) devices, liquid crystal display (LCD) devices, thin film transistor (TFT) devices, active matrix devices, organic light emitting diode (OLED) devices, organic electroluminescent (OEL) devices, electronic paper devices (e-paper) (such as eInk, Smart Paper™ by Gyricon Media, APD™ by Citala, etc.), and the like. As depicted in FIG. 1 an exemplary embodiment of system 100 may include display 110 that may be a foldable display or flexible display, as indicated by fold lines 115. Images displayed on display 110 are driven by a processing device 410 depicted in FIG. 2. In a particularly preferred embodiment, display 110 may be a foldable display that is detachable from a processing unit such as processing unit 410. Also, processing unit 410 may be, but it not limited to, a portable electronic device such as a handheld computer. Display 110 is configured to provide an image or images across substantially the entire planar surface of display 110, providing a relatively large display area. An output device or unit 120 is moveable over display 110 in any of a variety of directions indicated by directional arrows 125. Accordingly, output device 120 may be moved to any position on display 110.

In a particularly preferred embodiment, output device 120 includes a display surface and/or display window 130. Display window 130 may be any of a variety of display devices, such as, but not limited to, an LCD device, or any of a variety of other devices in which pixels of the image may be manipulated by electronic means in one surface of the device and light may be transmitted through window 130 to and from display 110. In an alternative embodiment, display window 130 need not be a transparent or translucent display, but may be a stand alone display having its own light source.

In an exemplary embodiment, images may be provided on display 110. Output device 120 includes a location sensor 135 (see FIG. 2) which provides a relative location signal to processing unit 410. The relative location signal is representative of the relative location of device 120 on display 110. The relative location signal sent to processing unit 410 may also include an orientation signal which provides the relative orientation of output device 120 on display 110.

When processing unit 410 receives the location signal, processing unit 410 is then aware of the image on display 110 that is being covered by window 130. Given information that window 130 is covering a specific image or portion of display 110, processing unit 410 is configured, via computer software, to generate complementary output to be displayed in window 130. In an exemplary embodiment, complementary output provided to window 130 may include, but is not limited to, complementary images providing additional or more detailed information than that which is displayed on display 110, an updated image that has been updated more recently than the image on display 110, an enhanced image (including localized color, improved lighting, localized display resolution, alternative fonts, magnification, additional color depth, additional color options), input options (buttons, menus, etc.), textual information, tactile feedback, etc. Data which is used to generate the image in window 130 is communicated to device 120 by any of a variety of means including, but not limited to, a wireless radio frequency link between device 120 and processing unit 410 via transceiver 136 in device 120 and a transceiver 420 in processing unit 410. In an alternative embodiment, communication may be made by a wired link instead of a wireless link.

Referring again to FIG. 1, in an exemplary embodiment, a set of buttons or other input devices 137 may be utilized on device 120 to provide input to device 120. Buttons 137 may be used to zoom in and out of window area 130, causing an enlargement or shrinkage of an image 133. Further, buttons 137 may also be used to provide an orientation signal such that image 133 may be rotated and/or the orientation of image 133 may be affected. Further, buttons 137 may be used for a variety of other functions relating to accessing data or manipulating images, etc.

Figure 2:
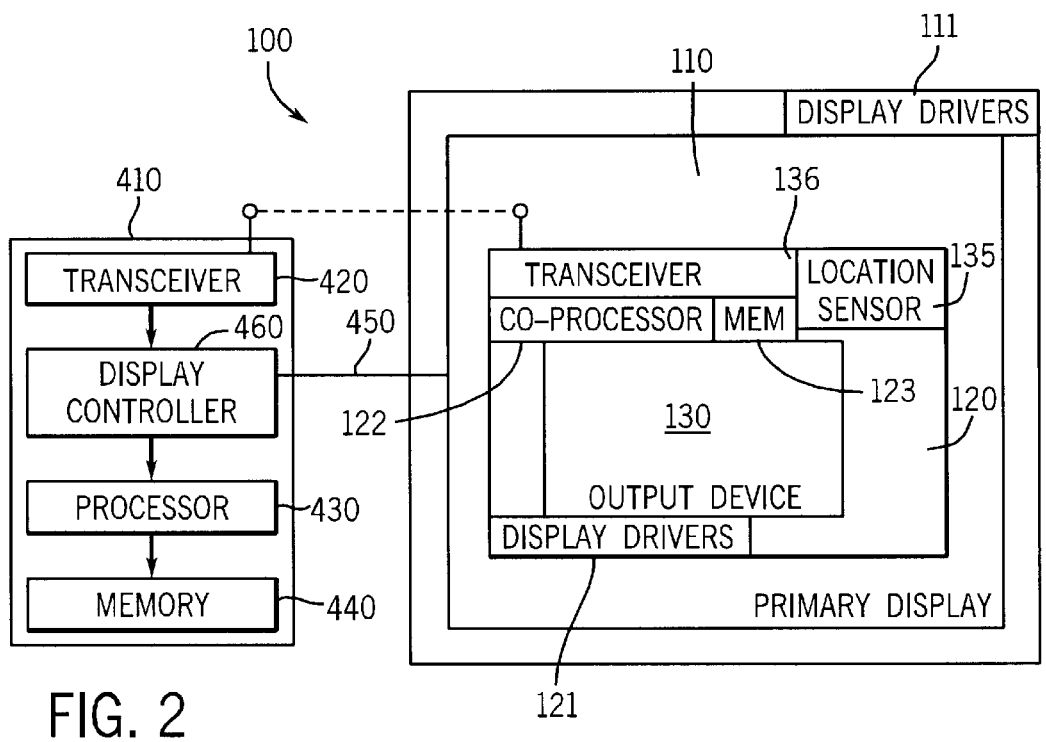
FIG. 2 is a generalized block diagram of a primary display device including electronics generating an image and a wireless output device moveable over the primary display device.

Referring now to FIG. 2, a block diagram of system 100 is depicted in FIG. 2. As discussed earlier, primary display 110 may be a large area display having disposed upon its surface an output device 120 having a display window 130 and further including a location sensor 135 and transceiver 136. Transceiver 136 is configured to communicate data between processing unit 410 via transceiver 420. Processing unit 410 includes a processor 430 coupled to a memory 440. Processor 430 is also coupled to a display controller 460 which may control both displays 110 and device 120 which use display drivers 111 and 121 respectively. Communications to primary display 110 may be provided through a signal bus 450 or other communications connections. Further, primary display 110 may be communicated with via transceiver 420. In a particular exemplary embodiment, display 120 may include its own co-processor 122 and memory 123.

Figure 3:
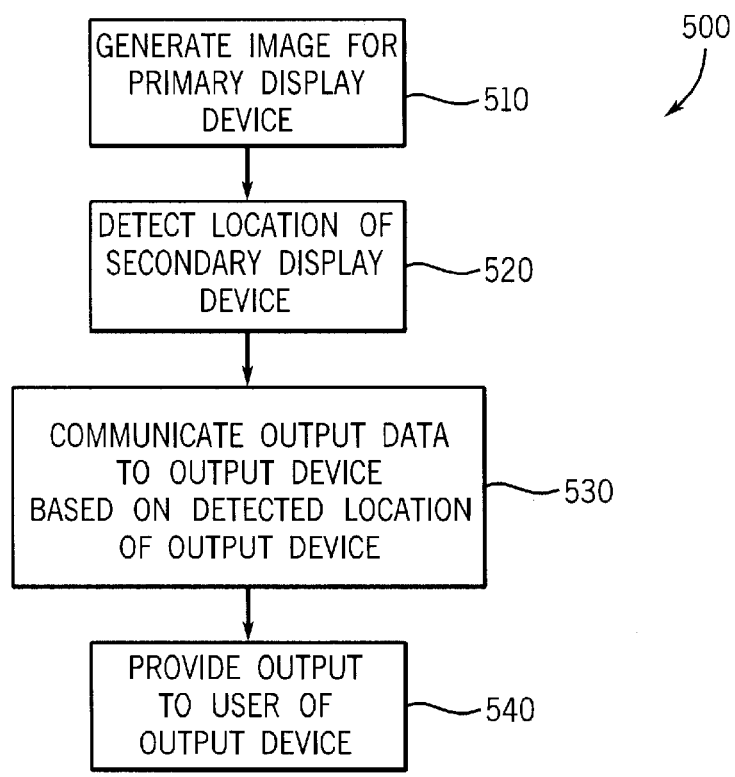
FIG. 3 is a process diagram of steps relating to providing output to a user of a moveable output device.

Referring now to FIG. 3, a process 500 is depicted. Process 500 utilizes the apparatuses described above and depicted in FIGS. 1 and 2. An image is generated on primary display device 110 (step 510). A user moves output device 120 to an appropriate position and activates the device. The location of output device 120 is then detected by sensors on either primary display 110 or on output device 120 or any combination thereof (step 520). After the location of output device 120 has been established and communicated to processing unit 410, processing unit 410 generates output data that is communicated to output device 120 and is based on the detected location of output device 120 (step 530). Output device 120 then provides output to a user of device 120. In a further exemplary embodiment, a user may provide input to device 120 via any of a variety of input methods, including but not limited to, tapping buttons 155 and/or 156 or the like, or via a touch screen interface associated with window 130. Input to device 120 may be provided by other means including buttons 137, voice input, movement of device 120, etc.

In an exemplary embodiment it should be noted that device 120 may be used for a variety of applications. For example, display 110 may have an outdated image on it. Device 110 may have an intentional low refresh rate to save both processing power and battery power on the host device or on display 110. As device 120 is moved over certain regions of display 110, those areas may be refreshed and/or a refreshed display may be provided in window 130. In another exemplary embodiment, window 130 would provide resolution enhancement of the region of display 110 which window 130 covers. For example, display 110 may be a monochrome display and device 120 may provide localized color. Further, display 110 may be a color display having a relatively low color depth (for example, 8-bit color). Device 120 may be used to provide additional color depth, such as, but not limited to 16-bit, 32-bit 64-bit color, etc. Another example of resolution enhancement that may be provided by window 130 may be the availability and use of alternative fonts, magnified text, magnified graphics, higher screen resolution, and the like. Further, additional textual information may be displayed. For example, display 110 may display information in a foreign language. Device 120 may then act as a translator and provide translated text into a user's native language the information being covered by device 120. Further, device 120 may be used to extract embedded information. As an example, a map may be displayed on display 110. The map view on display 110 may be fairly coarse, but in window 130, additional information may be provided such as, but not limited to local streets, house numbers, telephone numbers, zip codes, or the like. Further, places of interest may be provided and textual information relating to such places of interest may also be provided.

In an exemplary embodiment, display 110 may provide a limited lighting system. Device 120 may provide further illumination via a front or side light or the like such that information being covered by window 130 may be visualized using lighted display 130.

In a further exemplary embodiment, device 120 may include electronic muscle material that is controlled to expand and contract on the surface of device 120. If device 120 is required to provide buttons, for example, to a user, the electronic muscle material may be used to form buttons 155 and 156 that protrude from the surface of window 130. Electronic muscle is a gel-like polymer that is able to convert electrical energy to mechanical energy and conversely, mechanical energy to electrical energy when it is expanded and contracted. By sensing the charge distribution across the material, the materials surface profile or contour. Further, by altering the charge distribution material, its surface profile can be altered. Alterations may be performed on localized portions of the material to provide such contours as buttons 155 and 156. Utilizing controllable electronic muscle provides a user with tactical feedback. Further, other types of tactile feedback may be utilized in response to the location of device 120 on display 110, such tactical feedback including, but not limited to, vibrating, heating, cooling, expanding, contracting, moving, and the like.

In another exemplary embodiment, device 120 may be utilized for entertainment purposes, such as playing games. For example, device 120 may be used to play games, such as, but not limited to, the classic game of concentration, in which on areas of display 110 are hidden certain objects or pictures. As display 120 is moved over such hidden objects, the objects may be displayed. The object of the game is then to match found objects with objects located elsewhere on the display screen which a user of output device 120 was required to recall the location of from the user's memory. Further, other types of games may be contemplated and effectuated by the use of device 120.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physician characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A display system, comprising:
   a processor;
   a first display device having a first display surface and receiving display data from the processor;
   a second display device having a display area smaller than the first display device and moveable over the surface of the first display device; and
   a sensor in communication with the processor and communicating location data to the processor, the location data being representative of the relative location of the first display to the second display; and
   a program running on the processor and providing display data to the first and second display devices, such that the display data provided to the second display device is based on the location data.

2. The display system of claim 1, wherein the first display device includes a flexible display.

3. The display system of claim 2, wherein the first display device includes an e-paper display.

4. The display system of claim 1, wherein the first display includes a liquid crystal display.

5. The display system of claim 1, wherein the second display includes a liquid crystal display.

6. The display system of claim 1, wherein the sensor is a capacitate sensor.

7. The display system of claim 1 wherein the sensor is an optical sensor.

8. The display system of claim 1, wherein the second display provide solicitation for input by a user.

9. The display system of claim 1, wherein the second display provides an enhanced display.

10. The display system of claim 9, wherein the enhanced display includes at least one of magnification, zoom, color, depth, localized color.

11. The display system of claim 1, wherein the second display includes tactile feedback.

12. The display system of claim 1, wherein the display includes electronic muscle to provide tactile feedback to a user.

* * * * *